May 31, 1927.

M. J. FORRESTER 1,630,739

VEHICLE TOP

Filed April 8, 1924

INVENTOR
BY Michael J. Forrester
Rogers, Kennedy & Campbell
ATTORNEYS

May 31, 1927.

M. J. FORRESTER

VEHICLE TOP

Filed April 8, 1924

Inventor
Michael J. Forrester
Rogers Kennedy Campbell
by
Attys

Patented May 31, 1927.

1,630,739

UNITED STATES PATENT OFFICE.

MICHAEL J. FORRESTER, OF ASTORIA, NEW YORK, ASSIGNOR TO FIFTH AVENUE COACH COMPANY, A CORPORATION OF NEW YORK.

VEHICLE TOP.

Application filed April 8, 1924. Serial No. 704,925.

This invention relates to vehicle tops designed to protect the passengers or occupants of vehicles from the weather, and the invention has reference more particularly to tops for use in connection with motor vehicles having a floor or deck equipped with seats for the accommodation of passengers.

The aim of the invention is to provide a top which may be quickly an conveniently extended or "set up" to active position when the passenger space is to be covered, and may be as quickly and conveniently folded or "knocked down" to inactive position; whereby the passenger space or deck may be quickly converted into open or closed condition according to the weather.

With these and other objects in view, the invention consists of a vehicle top comprising, in combination, curtain supporting members extending over the passenger space or floor, and movable to inactive position out of the way, and curtains extending over and supported by said members and covering the passenger space or floor and adapted to be folded to expose the same.

The invention consists also in the form and relation of the curtain supporting members to the passenger seats which will permit the curtain supporting members to be housed between the seats when in inactive position.

The invention consists also in the combination with a top comprising the movable curtain supporting members and the foldable curtains, the latter terminating short of the ends of the passenger floor, of closures or covers for the ends of the floor, said closures adapted, when the curtains are extended, to form continuations of the same and cover the ends of the floor.

The invention consists also in the details, construction and combination of parts hereinafter described and claimed.

Referring to the drawings:

In the accompanying drawings the invention is illustrated by way of example as embodied in a top applied to the upper deck of a double deck motor bus, but it will be understood that the invention is not limited to such particular application, but may be employed as well in connection with a vehicle having a single deck or passenger floor, or for other and similar uses.

Referring particularly to Figs. 1 to 8, 1 designates the passenger floor, in this instance, the upper deck of a motor vehicle, having at each side a row of seats with a central aisle between the rows, and surrounded by a front rail 2, side rails 3 and a rear rail 4, which latter is shown as extending forwardly obliquely as at 5 and terminating inward of the rear end of the adjacent side rail so as to leave an opening as at 6 for the entrance of passengers. The front, side, and end rails are surmounted by glass panels or sashes 2ª, 3ª, and 4ª through which the outside may be viewed by the passengers occupying the seats.

Figure 3:
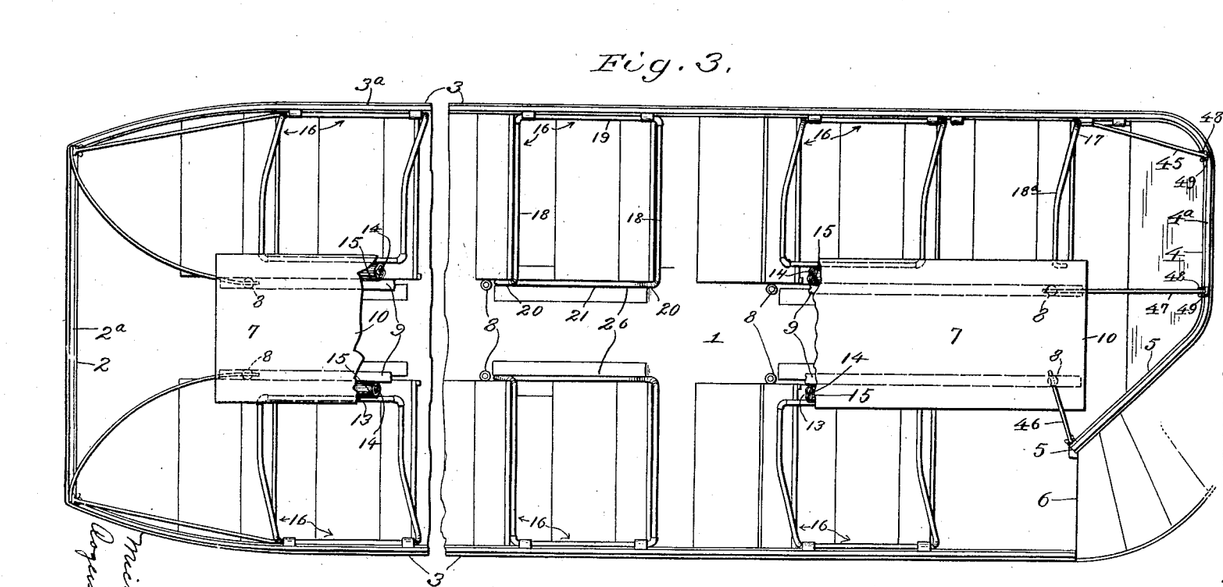
Fig. 3 is a plan view of the parts shown in Fig. 2, with portions broken away to expose other portions to view.

7 designates a narrow roof section or member which is supported some distance over the deck by two rows of supporting columns 8 fixed to and rising from the deck, which roof member extends longitudinally of the deck over the central aisle and terminates at its ends inward of the ends of the deck as best shown in Fig. 3. This roof section consists in the present instance of two parallel beams 9 spaced laterally from each other and fixed on edge to the upper ends of the two rows of columns 8, and a horizontal board or plate 10 fastened to the upper sides of the beams. This plate projects at its side and end edges beyond the sides and ends of the beams and is provided with depending side walls 11 and depending end walls 12 which form in connection with the two beams, longitudinal channels or spaces 13 at the outer sides of the beams, which channels are open at their bottoms.

Figures 4, 7:
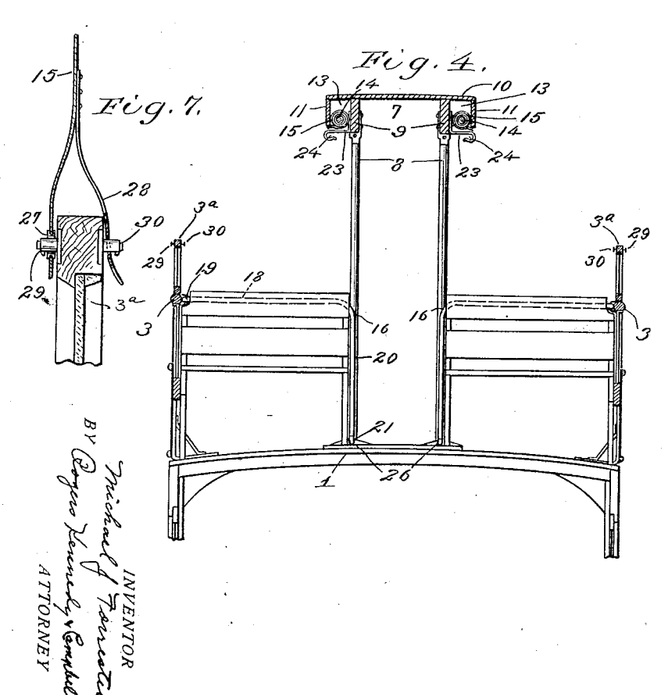
Fig. 4 is a transverse section on the line 4—4 of Fig. 2.
Fig. 7 is a section on an enlarged scale on the line 7—7 of Fig. 1 illustrating how the outer ends of the curtains are fastened in place when extended.
Figure 5:
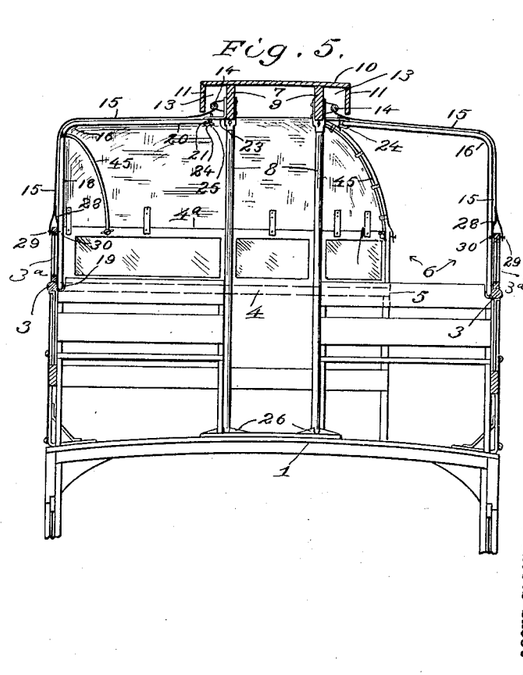
Fig. 5 is a similar view with the curtain supporting members in active position, and the curtains extended and supported thereby, and showing in elevation the closure for the rear end of the passenger floor.

Journaled in each of these channels between the end walls thereof is a spring actuated curtain roller 14, to which rollers the inner ends of curtains 15 are attached so that the curtains can be rolled up on the rollers and housed in the channels as shown in Fig. 4, or can be drawn out laterally and extended to cover the passenger floor as shown in Fig. 5. The curtains when thus drawn out extend over and are supported by curtain supporting members 16 of which there are in the present instance two series or sets, one set at each side of the deck, with three supporting members in each set, and a fourth member 17 at the rear end of the set, of slightly different form as will be more fully described later on. These curtain supporting members are pivoted at their outer ends to the side rails on a fore-and-aft axis so that the members of each set can be swung independently of each other up to active position to support the two curtains as shown in Figs. 1 and 5, and may be swung down to inactive position when the curtains are rolled up as shown in Fig. 4, the said members when down in inactive position being housed between the seats and out of the way.

Each of the supporting members except the members 17, consists in the present instance of two parallel prop arms 18 connected together at their outer ends by an outer end arm 19, and two parallel supporting arms 20 connected at their outer ends to the inner ends of the prop arms in angular relation thereto, and an inner end arm 21 connecting the inner ends of the supporting arms, the members thus constituted being each in the form of a single unitary structure.

Figure 6:
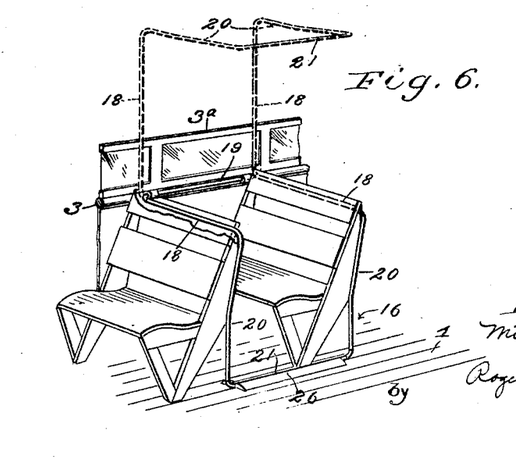
Fig. 6 is a perspective view on a reduced scale of two adjacent seats showing the manner in which the curtain supporting members are housed between the seats when in inactive position.

The outer end arms 19 of the supporting members are mounted in bearings 22 sustained at the inner sides of the side rails 3, whereby the members are swingable about the fore-and-aft axis before alluded to, and when the supporting members are swung upwardly to active position, the prop arms will extend vertically upwardly from the side rails, and the supporting arms will extend horizontally inwardly toward the roof member, in which position they will be supported from the roof member by means of bracket arms 23 extending outwardly at interval from the lower edges of the two beams 9 o. the roof member, and formed on their inner sides with open sockets 24. The relation of these sockets to the inner end arms 21 of the supporting members is such that when the supporting members are swung upwardly, the said end arms will move in the paths indicated by the dotted lines in Fig. 4 and will enter the sockets in the bracket arms as shown in Fig. 5 in which position they are confined by means of removable fastening pins 25 extending through holes in the bracket arms. When the supporting arms are swung downwardly to inactive position, the inner end arms 21 will enter sockets in cleats 26 extending longitudinally at the sides of the aisle between adjacent seats and secured to the floor or deck, the supporting arms 20 of each member will extend vertically along the inner ends of adjacent seats, and the prop arms 18 will extend along the backs of adjacent seats as shown in Fig. 6. In this way the supporting members in their lower inactive position will be compactly housed between the seats and out of the way.

Figure 1:
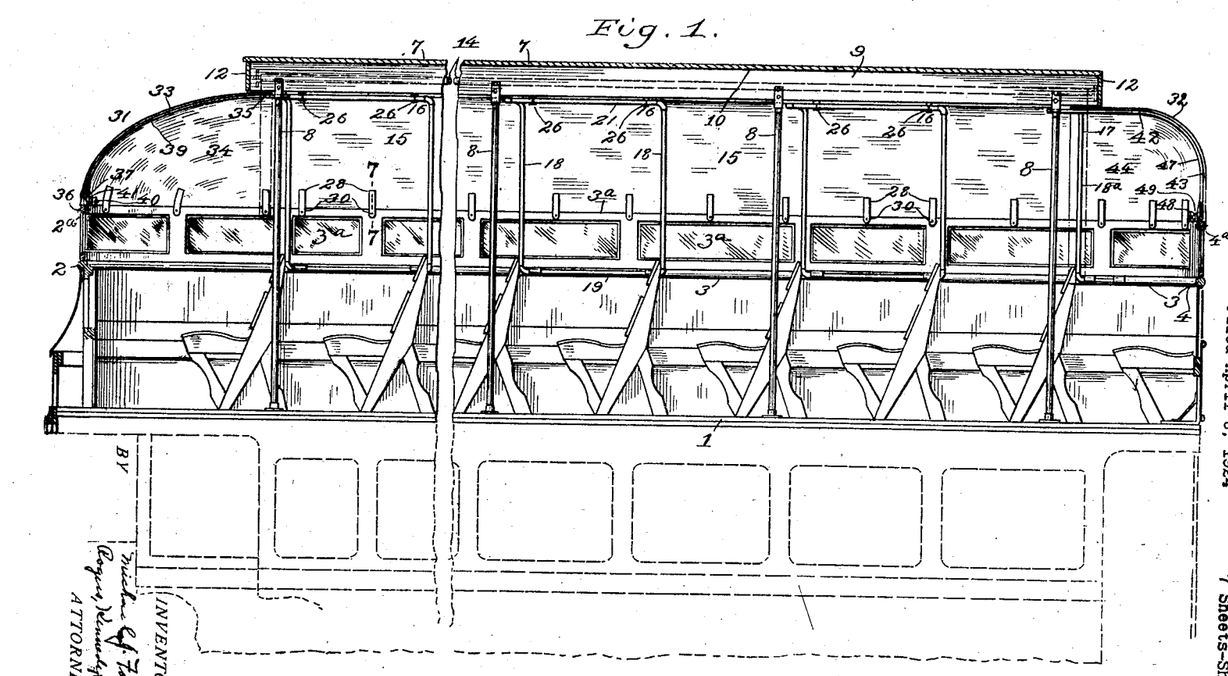
Fig. 1 is a longitudinal sectional elevation of the improved vehicle top applied to the upper deck of a double deck motor bus, showing the curtain supporting members in active position and the curtains extended to cover the deck.
Figure 2:
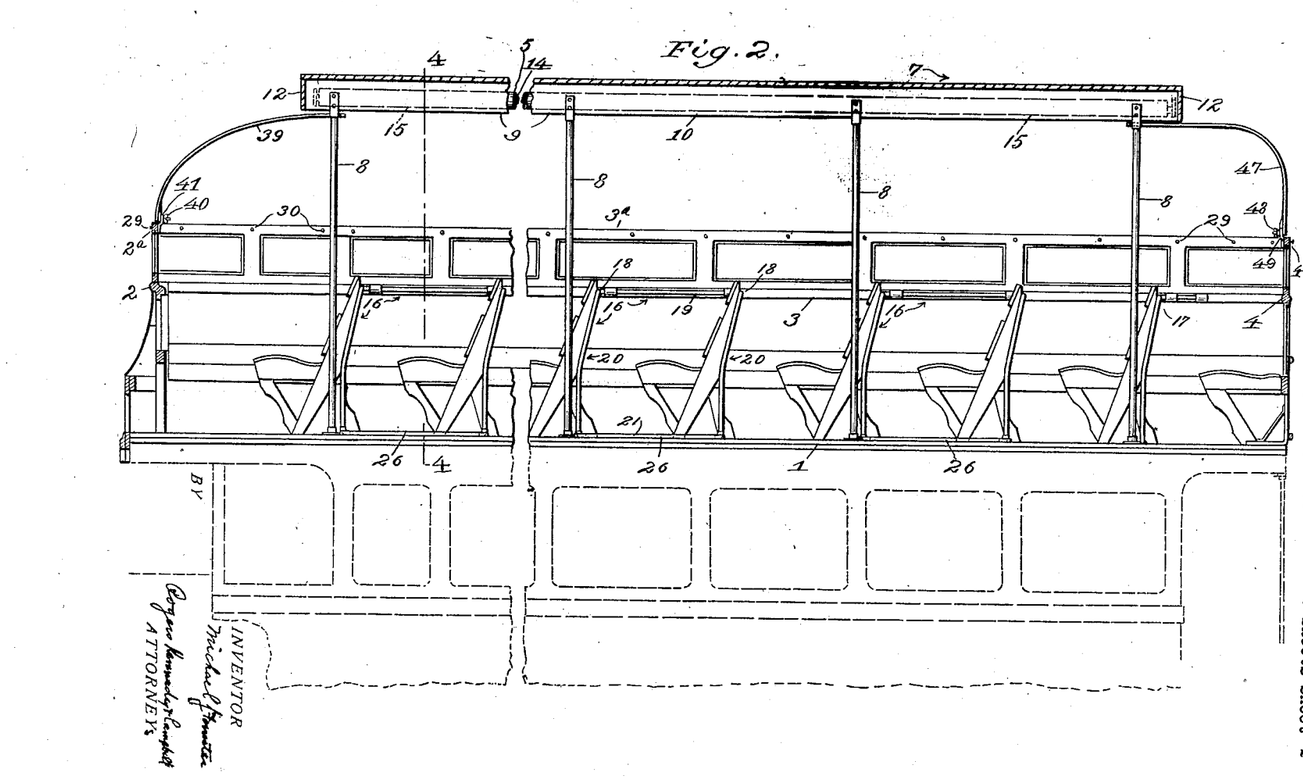
Fig. 2 is a similar view of the curtain supporting members in inactive position and the curtains folded to expose the deck.
Figure 8:
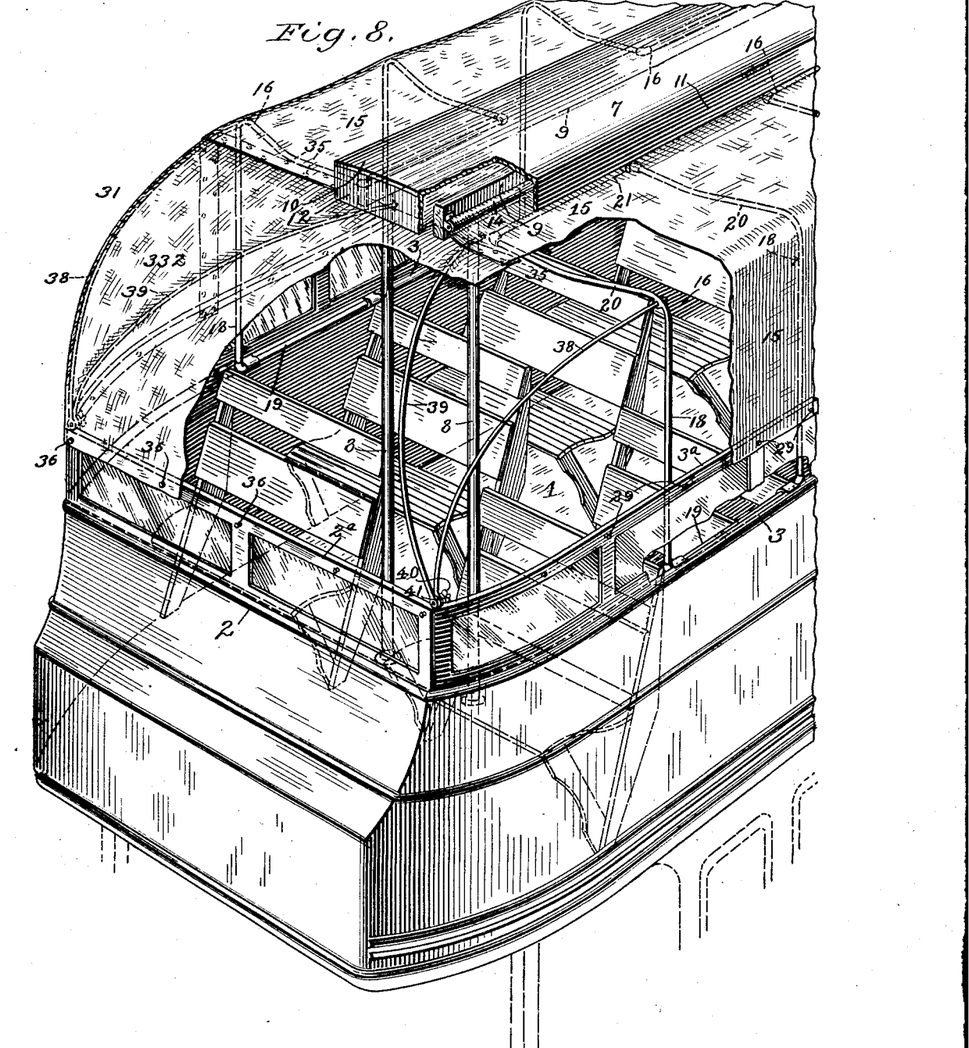
Fig. 8 is a perspective view of the forward end of the top with the front hood and the curtains extended, portions of said parts being broken away.

It will be understood from the foregoing description that with the curtains rolled up and the curtain supporting members in inactive position as shown in Fig. 4, the passenger floor will be completely exposed and uncovered except for the narrow longitudinal roof member; and when it is desired to cover the floor to protect the passengers against the weather, the curtain supporting members are first swung upwardly and their inner end arms fastened in the sockets in the bracket arms as described, and the two curtains are drawn outwardly and their outer ends brought down and fastened at intervals to the upper edges of the sash 3ª as shown in Figs. 1, 5 and 8, the curtains in this position being supported by the supporting members and constituting a top or cover which in connection with the roof member will completely cover the top and sides of the passenger floor. To enable the curtains to be conveniently fastened to the sash, and readily detached, the curtains are formed with holes or eyes 27 at intervals along their end edges, and on their inner sides they have attached to them at intervals corresponding to the holes, straps 28 which straps are likewise provided with holes. The holes in the curtains are passed over buttons or pins 29 projecting outwardly from the sides of the sash, which pins are provided with spring catches to hold the curtains in place on the pins; and the holes in the straps are passed over pins 30 projecting inwardly from the sides of the sash, the detailed construction of these parts being shown in Fig. 8.

The two curtains terminate at their side edges inward of the ends of the passenger floor, and in order that these ends may be also covered or uncovered as desired, a front end closure 31 is provided for the front end of the passenger floor, and a rear end closure 32 is provided for the rear end of the same. The front end closure, in the form of the invention illustrated in Figs. 1 to 8, consists of a flexible hood having a top portion 33 and two connected side portions 34, the said top portion being curved downwardly at the front so as to form the front end of the hood. This hood is adapted to be fastened at its inner edge along the forward edges of the two curtains 15 by suitable fastening devices or buttons 35, and it is adapted to be fastened along its lower edge to the front sash 2ª and the side sash 3ª, by pins or buttons 36 on the sash and straps 37 in the hood similar to the pins and straps employed for fastening the ends of the curtains when extended. The hood when thus fastened in place forms a forward continuation of the curtains 15 and completely covers the forward end of the passenger floor, it being understood that the hood may be readily detached or fastened in place to permit its convenient application or removal as desired. When fastened in place the hood is supported and maintained extended by two outer bow rods 38 and two inner bow rods 39 as best shown in Fig. 8. The outer bow rods are detachably connected at their lower ends by means of removable fastening bolts 40 to lugs 41 fixed to the side sash 3ª, and at their upper ends the rods are removably seated in sockets in the upper ends of the front prop arms of the two front curtain supporting members 15. The two inner bow rods 39 are similarly fastened at their lower ends to the lugs 41 and are curved inwardly towards each other and have their upper ends seated removably in sockets in the upper ends of the two front columns 8, the two sets of bow rods when thus fastened in position forming in effect an open framework over which the hood fits and by which it is supported in extended condition as shown in Fig. 8.

The rear end closure 32 consists of a flexible hood having a top portion 42, a rear end portion 43, and two side portions 44, and it is buttoned along its inner edge to the rear edge of that curtain 15 which is distant from the passenger entrance 6 and along the inner portion of the rear edge of the other curtain, and at its lower edge the hood is fastened to the side sash and the end sash, by suitable fastening pins and straps which may be similar to those employed in connection with the front closure. The hood when fastened in place is supported in extended condition by means of an outer bow rod 45, an inner bow rod 46, and an intermediate bow rod 47. The outer bow rod is detachably fastened at its lower end to the rear sash 4ª by a fastening bolt 48 and lug 49 similar to the bolts and lugs employed in connecting the forward bow rods, and at its upper end the bow rod 45 is seated removably in a socket in the upper end of the prop arm of the rear curtain supporting member 17. The intermediate bow rod 47 is fastened at its lower end detachably to the sash 4ª by a fastening bolt and lug similar to those just referred to, and at its upper end it is seated removably in a socket in the rear column 8 at the right hand side of the aisle in Fig. 3. The inner bow rod 46 is fastened at its lower end to the oblique end portion of the sash 4ª by means of a fastening bolt and lug similar to the other fastening bolts and lugs, and at its upper end it is removably seated in a hole or socket in the upper end of the rear column 8 at the left hand side of the aisle in Fig. 3. These three bow rods when fastened in place as described, form in effect an open frame over which the rear hood fits and by which it is supported in extended condition to cover the rear end of the passenger floor, it being noted that in this case, due to the passenger entrance 6, the hood terminates short of the rear end of the adjacent side rail 3 so as not to obstruct the passenger entrance.

As before stated, each of the curtain supporting members with the exception of the rear terminal ones 17, is made up of pairs of parallel angularly related arms. These terminal members however consist each of a single prop arm 18ª and a single supporting arm 20ª as best shown in Fig. 3.

Figure 9:
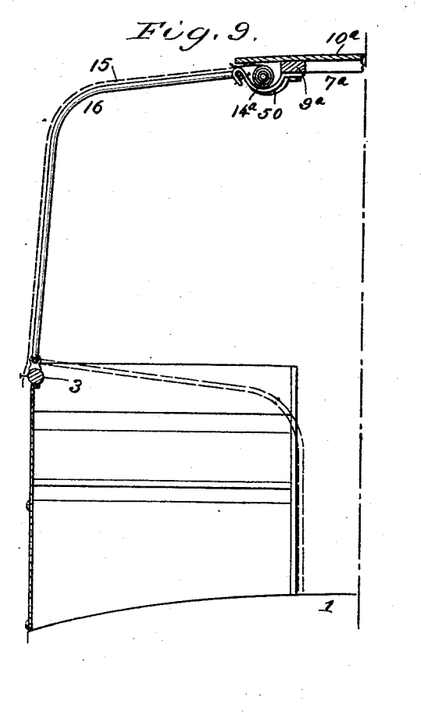
Fig. 9 is a transverse section through one side of the improved top showing the roof member thereof in modified form and the curtain roller journaled therein, in order to give greater head room on the passenger floor.

In Fig. 9 a modified form of the roof member is shown, the object being to give greater head room on the passenger floor than is available with the first form of the roof member described. In this case, the upper plate 10ª of the roof member 7ª does not extend downwardly as in the first instance described to form side and end walls, but is extended outwardly beyond the longitudinal rails or beams 9ª, which latter have fixed to their end sides, roller supporting brackets 50 between which and the under sides of the projecting ends of the roof of the plate, the curtain rollers 14ª are housed. This produces a flat roof member and gives considerably more overhead space than the first roof member described with its depending end and side walls. The supporting brackets 50 are formed similarly to the bracket arms 23, with sockets to receive the inner end arms of the curtain supporting members when the latter are swung upwardly to active position.

Figure 10:
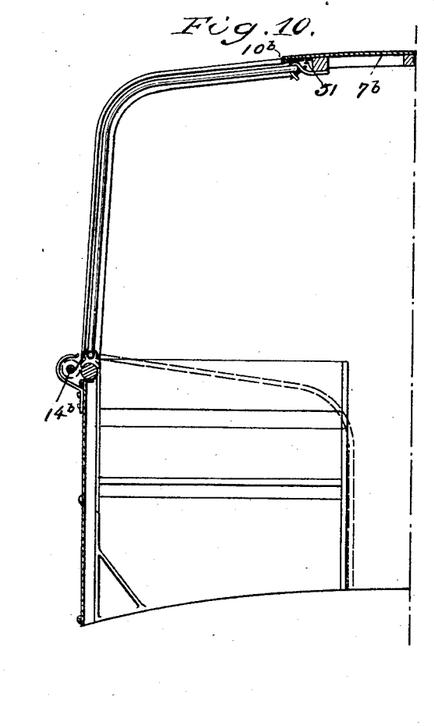
Fig. 10 is a transverse sectional elevation illustrating a modification of the invention in respect to the support of the curtain rollers.

In Fig. 10 the construction of the roof member 7ᵇ is substantially the same as that shown in Fig. 9, but in this case the curtain rollers 14ᵇ instead of being supported and housed in the roof member, are supported and housed at the outer sides of the side rails of the passenger floor, being journaled in bracket arms fixed to the outer sides of the rails and curved inwardly to form sockets or seats for the rollers. In extending the curtains to active position, they are drawn outwardly and upwardly from their rollers and their ends are fastened along the lower sides of the projecting edges of the roof plate 10ᵇ by fastening buttons 51.

Figure 11:
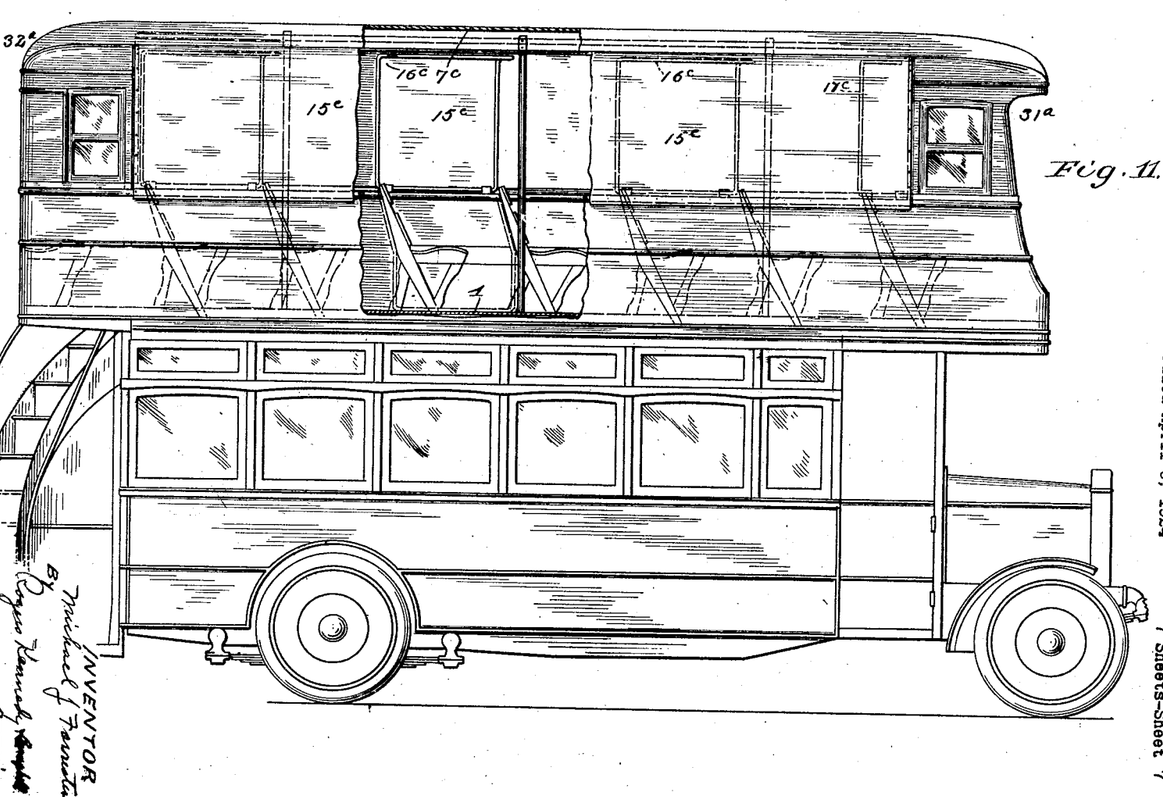
Fig. 11 is a side elevation of a double deck motor bus equipped with a top provided with end closures in modified form.

In Fig. 11 a modified form of the invention is shown in respect to the form of the closures for the front and rear ends of the passenger floor or deck. In this case instead of the end closures being flexible and capable of being "knocked down", they are in the form of permanent vestibule structures 31ᵃ and 32ᵃ supported by and rising from the front and rear ends respectively of the passenger floor and formed each with side and end walls and with a roof section. The longitudinal central roof member 7ᶜ is connected rigidly at its ends to the inner edges of the roof sections of the vestibule sections, and the curtains 15ᶜ are supported by and housed in the longitudinal roof member and are adapted to be drawn out and fastened to the side rails of the passenger floor and supported by the curtain supporting members 16ᶜ all similar to the construction and arrangement of the corresponding parts in the first example of the invention described. The outer edges of the two curtains are adapted to be buttoned or fastened in a suitable manner detachably to the inner edges of the vestibule sections at the sides of the same, so that when the curtains are thus extended and fastened down along their outer ends and side edges, they will, in connection with the vestibule sections form a complete closure for the entire passenger floor.

In the foregoing description and accompanying drawings I have disclosed my invention as embodying certain details of construction and arrangement of parts. It will be understood however that these details may be variously modified and changed by the skilled mechanic, and further it will be understood that the invention is not limited to any particular form or construction of the parts, except in so far as such limitations are set forth in the claims.

Having thus described my invention, what I claim is:

1. In combination with a vehicle having a row of seats extending longitudinally thereof, a top for said vehicle comprising a longitudinal roof member and a series of up-and-down swingable curtain-supporting members pivoted side by side at their lower ends to the side of the vehicle on fore-and-aft axes, and adapted when swung upwardly to be engaged at their upper ends with, and be supported by, said roof member so as to extend in operative position over the seats and thereby form supports for a foldable curtain, said members being swingable downwardly and inwardly transversely of the vehicle to inoperative positions, out of the way between the seats, when the curtain is to be folded.

2. In combination with a vehicle having a row of seats extending longitudinally thereof, a top for said vehicle comprising a longitudinal roof member and a series of angular up-and-down swingable curtain-supporting members pivoted at their lower ends, independently of each other, side by side to the side of the vehicle on aligned fore-and-aft axes, and adapted when swung upwardly to be engaged at their upper ends with, and be supported by, the roof member to extend in operative positions over the seats and thereby form supports for a foldable curtain, said members being swingable downwardly and inwardly transversely of the vehicle to inoperative positions, out of the way between the seats, when the curtain is to be folded.

3. In combination with a vehicle having a longitudinal row of seats, a top for said vehicle comprising a longitudinal roof member, and a series of individually swingable curtain-supporting members, each comprising two prop arms and two supporting arms extending inwardly from the upper ends of the prop arms at an angle thereto, the said prop arms of the several members being pivoted at their lower ends to the side of the vehicle on fore-and-aft axes, and the inner ends of the supporting arms being adapted to be engaged with the roof member to extend over the seats to form supports for a foldable curtain, said supporting members being swingable transversely of the vehicle inwardly and downwardly to inoperative positions between the seats, with the prop arms of a member extending respectively along the backs of adjacent seats, and with the supporting arms of said member extending respectively at the inner sides of adjacent seats.

4. In combination with a vehicle having seats, a top comprising curtain supporting members pivotally supported at their outer ends by the vehicle on fore-and-aft axes and comprising each parallel prop arms extending upwardly, connected parallel supporting arms extending inwardly and a longitudinal inner arm connecting the inner ends of the supporting arms, and curtains extended over and supported by said supporting members and adapted to be folded, said supporting members being adapted to be swung downwardly to inactive position with the prop arms extending along the backs of the seats, the supporting arms extending along the ends of the seats, and the inner arms extending between the inner ends of adjacent seats.

5. In combination with a vehicle having seats, a top comprising curtain supporting members each having parallel prop arms, connected parallel supporting arms, an outer arm connecting the outer ends of the prop arms, and an inner arm connecting the inner ends of the supporting arms, said outer arms being pivotally supported by the vehicle on a fore-and-aft axis with the supporting arms extending over the vehicle, a longitudinal roof member supported over the vehicle, means for fastening the inner arms of the supporting members detachably to said roof member, and curtains connected with the roof member and extended over and supported by the supporting members and adapted to be folded and housed by the roof member, said supporting members being adapted to be swung down to inactive position with the prop arms and supporting arms extending along the backs and ends respectively of the seats, and the inner arms extending between adjacent seats.

6. In combination with a vehicle having a passenger floor, a top for said floor comprising curtain supporting members extending over the floor, curtains extending over and supported by the said members and terminating at one of their side edges inward of the end of the floor, said curtains being adapted to be folded, and said supporting members being movable to inactive position out of the way when the curtains are folded, and an end closure for the floor comprising outer bow rods detachably connected respectively with the vehicle and with an overhead support, and a flexible hood detachably connected with said curtains and extended over and supported by said bow rods to cover the end of the floor.

7. In combination with a passenger floor provided with side and front rails and with a rear rail extending at one end forwardly and terminating at its end inwardly of the rear end of the adjacent side rail so as to leave a passenger entrance, a top for said floor comprising curtain supporting members extending above the deck and movable to inactive position out of the way, curtains extended over and supported by said supporting members and terminating at their rear edges short of the rear end of the floor, an outer bow rod detachably connected respectively with the rear end rail and with the adjacent curtain supporting member, an inner bow rod detachably connected respectively with the terminal portion of the end rail and with an overhead support, and a flexible hood detachably connected with the rear edge of one of the first mentioned curtains and extended over and supported by said bow rods to cover the end of the floor, said hood terminating short of the rear end of the side rail so as not to obstruct the passenger entrance.

In testimony whereof, I have affixed my signature hereto.

MICHAEL J. FORRESTER.